United States Patent
Baltersee et al.

(10) Patent No.: US 7,167,506 B2
(45) Date of Patent: Jan. 23, 2007

(54) METHOD AND RAKE RECEIVER FOR PHASOR ESTIMATION IN COMMUNICATION SYSTEMS

(75) Inventors: Jens Baltersee, Cologne (DE); Gunnar Fock, Aachen (DE); Peter Schulz-Rittich, Aachen (DE)

(73) Assignee: Agere Systems Inc., Allentown, PA (US)

( * ) Notice: Subject to any disclaimer, the term of this patent is extended or adjusted under 35 U.S.C. 154(b) by 521 days.

(21) Appl. No.: 09/798,813

(22) Filed: Mar. 2, 2001

(65) Prior Publication Data

US 2001/0038665 A1 Nov. 8, 2001

(30) Foreign Application Priority Data

Mar. 3, 2000 (EP) ................. 00104637

(51) Int. Cl.
*H04B 15/00* (2006.01)
*H04B 1/00* (2006.01)
*H04B 27/30* (2006.01)

(52) U.S. Cl. ............... 375/148; 375/144; 375/349
(58) Field of Classification Search ............ 375/260, 375/130, 142, 143, 144, 147, 148, 150, 152, 375/285, 316, 346, 348, 349, 350
See application file for complete search history.

(56) References Cited

U.S. PATENT DOCUMENTS

| | | | |
|---|---|---|---|
| 5,361,276 A | 11/1994 | Subramanian | 375/1 |
| 5,463,660 A | 10/1995 | Fukasawa et al. | 375/205 |
| 5,719,899 A | 2/1998 | Thielecke et al. | 375/206 |
| 5,790,588 A | 8/1998 | Fukawa et al. | 375/148 |
| 5,828,705 A * | 10/1998 | Kroeger et al. | 375/326 |
| 5,978,423 A | 11/1999 | Farjh | 375/347 |
| 5,987,014 A * | 11/1999 | Magill et al. | 370/335 |
| 6,034,986 A * | 3/2000 | Yellin | 375/148 |
| 6,137,788 A * | 10/2000 | Sawahashi et al. | 370/342 |
| 6,154,443 A * | 11/2000 | Huang et al. | 370/210 |

(Continued)

FOREIGN PATENT DOCUMENTS

EP 0 849 887 A2 12/1997

(Continued)

OTHER PUBLICATIONS

H. Huang et al., "Improving Detection and Estimation in Pilot-Aided Frequency Selective CDMA Channels," 1997 IEEE 6th International Conference on Universal Person Communications Record. Bridging The Way to the 21st Century, ICUPC '97. Proceedings of ICUPC 97—6th International Conference on Universal Personal Com, vol. 1, pp. 198-201 (1997).

(Continued)

*Primary Examiner*—Jean B. Corrielus (57) ABSTRACT

The invention relates to a channel estimation algorithm is proposed for a RAKE receiver for CDMA communication systems operating in the downlink of a mobile communication scenario yielding an improved phasor estimation. Received signals are distributed to a plurality of receiver fingers of a RAKE receiver. Each receiver finger i is assigned to a signal path of the transmitted signal which is subject to phase shift and power dissipation due to reflection, diffraction and scattering. According to the invention the approach partly cancels multipath/multiuser interference and offers the advantage of being able to cope with physically closely spaced multipaths.

14 Claims, 4 Drawing Sheets

U.S. PATENT DOCUMENTS

| | | | |
|---|---|---|---|
| 6,175,587 B1 | 1/2001 | Madhow et al. | 375/148 |
| 6,215,814 B1* | 4/2001 | Ylitalo et al. | 375/148 |
| 6,269,075 B1* | 7/2001 | Tran | 370/206 |
| 6,272,189 B1 | 8/2001 | Garin et al. | 375/343 |
| 6,456,648 B1 | 9/2002 | Bultan et al. | 375/148 |
| 6,456,653 B1 | 9/2002 | Sayeed | 375/227 |
| 6,473,415 B1 | 10/2002 | Kim et al. | 370/342 |
| 6,480,526 B1* | 11/2002 | Shoki et al. | 375/147 |
| 6,532,254 B1 | 3/2003 | Jokinen | 375/148 |
| 6,535,549 B1* | 3/2003 | Scott et al. | 375/219 |
| 6,567,482 B1* | 5/2003 | Popovic' | 375/343 |
| 6,570,909 B1* | 5/2003 | Kansakoski et al. | 375/148 |
| 6,570,918 B1* | 5/2003 | Rademacher | 375/232 |
| 6,600,729 B1 | 7/2003 | Suzuki | 370/335 |
| 6,633,553 B1 | 10/2003 | Hwang | 370/329 |
| 6,661,835 B1 | 12/2003 | Sugimoto et al. | 375/148 |
| 6,683,924 B1* | 1/2004 | Ottosson et al. | 375/343 |
| 6,707,844 B1* | 3/2004 | Imaizumi et al. | 375/148 |
| 6,714,585 B1 | 3/2004 | Wang et al. | 375/148 |
| 6,747,969 B1 | 6/2004 | Hirsch | 370/342 |
| 6,757,346 B1 | 6/2004 | Saito et al. | 375/349 |
| 6,768,727 B1 | 7/2004 | Sourour et al. | 370/335 |
| 6,785,323 B1 | 8/2004 | Proctor, Jr. | 375/146 |
| 6,798,737 B1 | 9/2004 | Dabak et al. | 370/209 |
| 6,865,218 B1* | 3/2005 | Sourour | 375/148 |
| 2001/0028677 A1 | 10/2001 | Wang et al. | 375/148 |
| 2002/0034218 A1 | 3/2002 | Papasakellariou et al. | 375/148 |
| 2002/0044592 A1 | 4/2002 | Razzell | 375/148 |
| 2002/0051486 A1 | 5/2002 | Aue | 375/150 |
| 2002/0131479 A1 | 9/2002 | Butler et al. | 375/147 |
| 2003/0091104 A1 | 5/2003 | Yellin | 375/148 |
| 2003/0193914 A1* | 10/2003 | Lomp et al. | 370/335 |
| 2005/0265430 A1* | 12/2005 | Ozluturk et al. | 375/145 |

FOREIGN PATENT DOCUMENTS

| | | |
|---|---|---|
| EP | 0 993 127 A1 | 10/1999 |
| EP | 0993127 A1 | 4/2000 |
| WO | WO 95/34140 | 4/1995 |
| WO | WO 00/21209 | 4/2000 |

OTHER PUBLICATIONS

Vijay K. Garg, *"IS-95 CDMA and CDMA 2000,"* Prentice Hall PTR, 2000, pp. 60-70.

W. Sheen, et al., *"A Noncoherent Tracking Loop With Diversity and Multipath Interference Cancellation for Direct-Sequence Spread-Spectrum Systems,"* IEEE Transactions on Communications, Nov. 1998, vol. 46, No. 11, pp. 1516-1524.

H. Huang, et al., *"Improving Detection and Estimation in Pilot-Aided Frequency Selective CDMA Channel,"* IEEE 6th International Conference on Universal Person Communications, 1997, vol. 1, pp. 198-201.

* cited by examiner

METHOD AND RAKE RECEIVER FOR PHASOR ESTIMATION IN COMMUNICATION SYSTEMS

CROSS-REFERENCE TO RELATED APPLICATION

This application claims priority of European Patent Application No. 00104637.4, which was filed on Mar. 3, 2000.

FIELD OF THE INVENTION

The invention relates to a method and a RAKE receiver for phasor estimation in communication systems in general and in direct sequence code division multiple access (DS-CDMA) communication systems being subject to multipath fading in particular.

BACKGROUND OF THE INVENTION

Digital wireless communication systems are of increasing interest for all types of data and speech transmission. A frequently used method in particular for mobile cellular communications is code division multiple access (CDMA), e.g. according to the Universal Mobile Telephone System (UMTS). For CDMA the signal to be transmitted is typically spread to a multiple of its original bandwidth. The signal with spread bandwidth is less sensitive to interference and the spectral power density is reduced. Commonly, direct sequence CDMA (DS-CDMA) is used, where the signal is multiplied or correlated by a code sequence before modulation. The spread and correlated symbols are called chips. Using a plurality of code sequences being orthogonal to each other a plurality of communication connections can utilise the A same frequency band. Due to the orthogonality of the codes the transmitted signals can be decoded or decorrelated uniquely in the receiver. An advantageous group of code sequences are so-called pseudo-noise (PN) bit sequences which are typically used for direct sequence CDMA. CDMA and pseudo-noise correlation are known to those skilled in the art.

However, in a wireless communication system a transmitted signal may still propagate along different paths due to reflection or scattering. Therefore, the signal is received as a superposition of different signal components each propagated along one of the possible paths. As reflected signals will be differently delayed according to their paths compared to each other and compared to the direct signal, each of the signal components of one specific path is interfered by a plurality of other time- and phase-shifted signal components of other propagation paths. If there is no direct sight between the transmitter and the receiver the connection can still be provided by the reflected or scattered signal components, but their interference generally causes disadvantageous effects to the connection performance.

Also the CDMA radio channel is characterised by multipath propagation where a number of reflected or scattered radio rays arrive at the receiving end. Each of the rays, as seen by the receiver, is characterised by a distinct phasor and time-delay. The RAKE receiver is a commonly used structure to demodulate the DS-CDMA signal, suggested by the third Generation Partnership Project [3GPP] (see Technical Specification Group Radio Access Network; Physical layer—General description [3G TS 25.201 version 3.0.0] which is incorporated herewith by reference) as a low-complexity solution for fast time-to-market, and will be the receiver of choice for the first wave of CDMA handsets. In each finger of the RAKE receiver, the phase shift, and the propagation delay of the selected multipath have to be compensated for, a task called synchronisation. Any realisable receiver follows the concept of synchronised detection which is described in detail by Heinrich Meyr, Marc Moeneclaey and Stefan Fechtel, Digital Communication Receivers: Synchronization, Channel Estimation and Signal Processing, John Wiley and Sons, New York, 1998, which is incorporated herewith by reference, further referred to as reference [1] and for which a channel estimate or a sampled version thereof must be formed and subsequently used for detection as if it were the true known channel.

In the RAKE receiver the signal components being part of the received multipath signal, which is in fact a superposition of the signal components are summed to increase the signal height and to improve the signal-to-noise ratio (SNR). Before summing it is necessary to derotate and weight each signal component by the phasor.

Disadvantageously the quality of the estimate of the phasor itself is influenced by the multipath fading, resulting in a reduced efficiency of the signal component summation. Therefore, the signal height and the signal-to-noise ratio is worse than it could be, if the phasors would be known exactly. Resulting from this another disadvantageous effect is an increase of the bit error rate. In particular, if the delay between two signal propagation paths (signal paths) is small, i.e. shorter than one chip duration or in the range of one to two chip durations interference between the signal components of neighbouring paths is disadvantageously strong.

SUMMARY OF THE INVENTION

Therefore, it is an object of the invention to provide a method and a RAKE receiver for CDMA communication systems with improved phasor estimation.

Another object of the invention is to provide a method and a RAKE receiver for CDMA communication systems with improved performance, in particular providing simple mathematical operations, being low cost intensive and/or overcoming or at least reducing the disadvantages of the prior art.

Advantageously, the method and RAKE receiver according to the invention provides a reduction or nearly a cancellation of the disturbing effects on the phasor estimation due to the multipath interference. It was found by the inventors, that a phasor estimate of one finger of the RAKE receiver can be regarded as comprising the exact phasor value of the assigned signal path and an interference term caused by the different other signal paths. Furthermore, the interference term can be subdivided in two contributions, where the first one is some kind of stochastic error, i.e. is similar to white noise. The second contribution is some kind of systematic error which has a similar bandwidth as the received signal. Therefore, it is especially difficult to suppress the second contribution by filtering.

Advantageously, the method and RAKE receiver according to the invention is, in particular, suited to estimate the second contribution. Then appropriate countermeasures as cancellation or compensation can be taken to reduce the negative effects of the second contribution improving the quality of the phasor estimation. By the improved phasor estimation an improved efficiency of the signal component summation is achieved. Consequently, the signal height and the signal-to-noise ratio is better than in the prior art systems. Additionally the bit error rate can be decreased. These advantageous effects are also achieved, if the delay between two signal paths is small, i.e. shorter than one chip duration or in the range of one to two chip durations interference between the signal components of neighbouring paths.

Preferably an estimated interference signal is subtracted from the decorrelated digitised signal, which is an advantageously simple operation.

Most preferably the interference compensated signal is filtered by a filter being adapted to the bandwidth of the phasor, which is advantageous, as white noise is effectively filtered or suppressed.

In one embodiment, the present invention is a RAKE receiver for processing a received electromagnetic signal being a superposition of signal components of different signal propagation paths. The RAKE receiver comprises an Analog-to-Digital converter configured to digitise the received signal, a plurality of receiver fingers, wherein at least a first one of the receiver fingers is adapted to receive a first signal component assigned to a first one of the signal paths (i), a correlator for decorrelation of the digitised signal by a code sequence, a device for estimation of interference between the first signal component with a second signal component assigned to a second of the signal paths (j, j≠i), and a device for phasor estimation of the first signal component.

In particular, performing maximum likelihood phasor estimation is a simple operation.

BRIEF DESCRIPTION OF THE FIGURES

The invention is described in detail hereinafter by means of preferred embodiments and reference is made to the attached drawings.

It is shown in

FIG. 1 a block diagram of mainly one of the fingers of the detection stream of a RAKE receiver according to the invention, FIG. 2 the power of the channel estimates versus time without interference cancellation, FIG. 3 the power of the channel estimates versus time with interference cancellation and FIG. 4 the results of bit error rates (BER) for the intermediate signal-to-noise ratio (SNR) values interpolated.

DETAILED DESCRIPTION OF THE INVENTION

Figure 1:
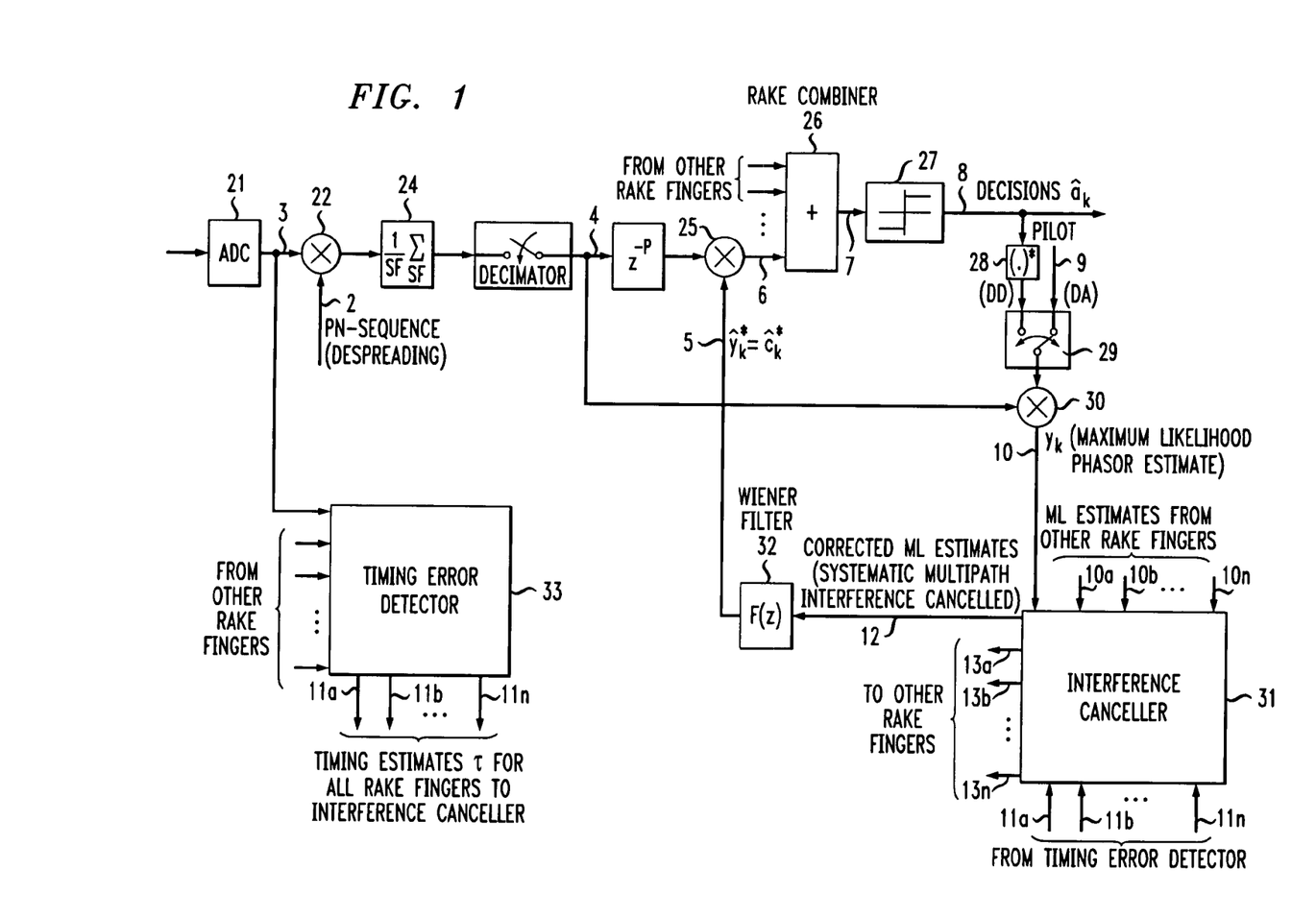

The block diagram of FIG. 1 can also be read as a flow chart of the method according to the invention.

FIG. 1 presents the structure of one of the RAKE receiver fingers 1 for a direct sequence CDMA communication system, where a typical, but not necessary number of fingers is about four to eight. For direct sequence CDMA the signal is spread by a factor of 2L in the transmitter and multiplied by a code sequence before modulation, yielding chips of a duration TC. For the preferred embodiment a pseudo-noise (PN) code sequence 2 is used. A wirelessly transmitted signal is received and is fed after some known filtering, further processing (not shown) and digitising by an analogue-to-digital-converter (ADC) 21 as signal component 3 into the RAKE finger 1. The signal 3 is multiplied by the complex-conjugate of the PN-sequence 2 at element 22. At element 24 it is summed over the chips to receive symbols 4. Received symbols 4 are multiplied at element 25 with interference reduced or corrected phasors 5 to be derotated and weighted. Derotated and weighted symbols 6 are summed with derotated and weighted symbols of all RAKE fingers in a RAKE combiner 26. In a decider 27 decisions about the symbols were taken yielding decisions or symbols 8. Symbol decisions 8 were complex-conjugated at element 28 and multiplied at element 30 with the received symbols 4, which yields a maximum likelihood (ML) phasor estimation 10. As input for element 30 also pilot symbols 9 can be used instead of the complex-conjugated received symbol decisions 8, where a switch 29 changes between the symbol decisions 8 and the pilot symbols 9. The ML estimate is fed in an interference canceller 31 where interference of other RAKE fingers is reduced or subtracted using the ML estimates 10*a*, 10*b*, . . . , 10*n* of the other fingers and timing error signals 11*a*, 11*b*, . . . , 11*n* from timing error detectors 33 from all fingers. The corrected phasors 12 are filtered by a Wiener filter (32) which is adapted to the signal-to-noise-ratio (SNR) and to the bandwidth of the signal to reduce disturbance of white noise yielding the filtered corrected phasors 5. The corrected phasors are also distributed 13*a*, 13*b*, . . . , 13*n* to all others RAKE fingers by the interference canceller 31.

Transmission Model

In a CDMA transmission system, the user data symbols {ak} are oversampled by the spreading factor Nc=T/Tc and then multiplied by a user spreading sequence ($d_0$, . . . , $d_{Nc-1}$), T and Tc being the symbol and chip duration, respectively. The baseband-equivalent received signal r(t) which is subject to multipath propagation is given by $$r(t) = \sum_{l=0}^{N_p-1} c_l(t) \sum_n a_n \sum_{v=0}^{N_c-1} d_v g_T(t - nT - vT_c - \tau_1) + m(t) \quad (1)$$

where gT(t) is the transmit filter impulse response, Np is the number of discrete multipaths and the ('s are the corresponding propagation delays. The term m(t) models the additive white gaussian noise (AWGN) and any interference from other users, which we assume here to be approximately white. Therefore, the noise m(t) is simply characterized by its power spectral density N0. We now go on considering the received signal zl,k after receive matched-filtering, interpolation and decimation to chip rate. The interpolation process, which is performed for each multipath in an individually assigned RAKE finger, takes care of the timing delays (I and delivers samples at the correct time instance, such that the resulting raised-cosine function behaves like the Dirac Delta ((t) and cancels out any dependency on previous or later symbols. Therefore, we can now write $$z_{1,k} = a_n \cdot \sum_{v=0}^{N_c-1} c_{l,k} \cdot d_v \cdot g(kT_c - nT - vT_c) \quad (2)$$

$$a_n \cdot \sum_{\substack{i=0 \\ i \neq 1}}^{N_p-1} \sum_{v=0}^{N_c-1} c_{l,k} \cdot d_v \cdot g(kT_c - nT - vT_c - \tau_{l,i}) + m_{l,k}$$

It is noticed here, that $Z_{l,k}$ consists of a desired term which corresponds to multipath 1, and an interference term which is due to the other multipaths i (1. Therefore, in the above equation, $\tau_{l,i}$ refers to the delay between the (desired) path 1 and other (interfering) paths i. For the scope of this preferred embodiment, it is assumed that the ('s are time-invariant. This assumption is fully justified, since the time delays (are extremely slowly time-varying, as compared to the channel phasors. The raised cosine impulse response, which results from pulse-matched filtering the received signal with a root-raised cosine filter, is denoted g(t). The next step required for detecting the symbol is the despreading. In order to do so, the signal $Z_{l,k}$ is now multiplied with the spreading sequence d, before summing the signal over one symbol period. Therefore, the despread signal, denoted with $y_{l,n}$, simplifies to an expression very familiar to the matched filter output known from traditional (non-spread) frequency nonselective single-carrier communication systems, apart from some additional unwanted multipath interference.

$$y_{l,n} = \sum_{k=nN_c}^{(n+1)N_c-1} d_{k \bmod N_c} z_{l,k} + m_{l,k} \quad (3)$$

$$= a_n c_{l,n} +$$

$$a_n \sum_i \sum_k \sum_v c_{l,k} d_{k \bmod N_c} d_v g(kT_c - nT - vT_c - \tau_{l,i}) + m_{l,n}$$

Finally, exploiting the frequency diversity inherent in the received signal is accomplished by the combiner. The combiner forms a weighted sum of the signals yl;n, by performing a linear combination of all Np assigned RAKE fingers.

$$\hat{a}_n = \sum_{l=0}^{N_p-1} q_{l,n} \cdot y_{l,n} \quad (4)$$

Denoting the phasor estimate with l,n, the optimal combiner coefficients ql,n are given by $$q_{l,n} = \frac{\hat{c}_{l,n}^*}{\sum_{l=0}^{N_p-1} |\hat{c}_{l,n}|^2} \quad (5)$$

Channel Dynamics

The time-variant fading coefficients $\{c_{l,n}\}$ are complex-valued random processes. The random fading process is assumed to be white-sense stationary (WSS), i.e., this process is sufficiently characterized by its mean and covariance. Furthermore, the Np fading processes are assumed to undergo mutually uncorrelated scattering (US), which is plausible since individual paths can often be attributed to distinct physical scatterers. The power spectral density $S(e^{jw})$ of a channel coefficient $c_{l,n}$ is given by the so-called Jakes spectrum. It is strictly bandlimited to the (normalized to symbol rate) Doppler frequency $\lambda$ and its autocorrelation is denoted with R:

$$\lambda = f_0 \cdot \frac{v}{c} \cdot T \quad (6)$$

$$S(e^{j\omega}) = \rho_l \cdot \begin{cases} \frac{1}{\pi\lambda} \cdot \frac{1}{\sqrt{1 - \left(\frac{\omega}{2\pi\lambda}\right)^2}} & \text{for } |\omega| \leq 2\pi\lambda \\ 0 & \text{otherwise} \end{cases} \quad (7)$$

$$R(n) = \rho_l \cdot J_0(2\pi\lambda \cdot n) = \rho_l \cdot \alpha(n) \quad (8)$$

In the above equations, $\rho_l$ is the average process power of the l-th path, f0 is the carrier frequency (2 GHz), c is the speed of light, v is the velocity of the mobile handset, and J0(.) is the Bessel function of the first kind of order 0.

Phasor Estimation

Based on the transmission model given by equation (3), the optimal channel estimator is given by the conditional expected value given all available observations y and the corresponding symbol sequence a.

$$\hat{c}_{l,n} = E[c_{l,n}|y,a] \quad (9)$$

In reference [1], it is shown, that this optimal channel estimate can be generated by low-pass filtering maximum-likelihood channel estimates ML;l with a Wiener filter w, i.e. we have that $$\hat{c}_{l,n} = w^H \cdot \hat{c}_{ML;l} \quad (10)$$

Here, we constrain the Wiener filter to a fixed number of Nw co-efficients. The Wiener filter therefore reduces to a single, time-invariant Nw-tap Finite Impulse Response (FIR) filter $w = (w_0, w_1 \ldots, w_{N_w-1})^T$. How to obtain the filter taps weights and error covariance is shown later on. In essence, it can be said that the phasor estimation algorithm relies on ML channel estimates, which are simply postprocessed (filtered) by a fixed FIR filter.

Maximum Likelihood Channel Estimation With Multipath Interference Cancellation

Let's have another look at the correlator output given by $$y_{l,n} = \sum_{k=nN_c}^{(n+1)N_c-1} d_{k \bmod N_c} z_{l,k} + m_{l,k} \quad (11)$$

$$= a_n c_{l,n} +$$

$$a_n \sum_i \sum_k \sum_v c_{l,k} d_{k \bmod N_c} d_v g(kT_c - nT - vT_c - \tau_{l,i}) + m_{l,n}$$

Usually, in a CDMA system the assumption is made that the terms due to unwanted multipaths are negligibly small and can be omitted. In that case, the correlator output reduces to $$y_{l,n} = a_n c_{l,n} + m_{l,n} \quad (12)$$

If this assumption holds, the maximum likelihood (ML) channel estimates are simply given by reference [1]

$$\hat{c}_{ML;l,n} = a_n^* y_{l,n} = c_{l,n} + \tilde{m}_{l,n} \quad (13)$$

Unfortunately, this assumption only holds in the special case of the additive white Gaussian noise (AWGN) channel, where the signal is not subject to multipath propagation. If, however, multipath propagation is present, the interfering multipaths cannot be neglected. Why this is the case will become clearer shortly. Let's assume that ML phasor estimates are formed using equation (11) and a simple complex conjugate multiplication with a known symbol $a_n$. The multipath interference then introduces an additional term in the ML phasor estimate and is given by $$\sum_i \sum_k \sum_v c_{l,k} d_{k \bmod N_c} d_v g(kT_c - nT - vT_c - \tau_{l,i}) = \sum_i g(-\tau_{l,i})c_{i,n} + \quad (14)$$

$$\sum_i \underbrace{\sum_k \sum_v}_{k \bmod N_c \ne v} c_{l,k} d_{k \bmod N_c} d_v g(kT_c - nT - vT_c - \tau_{l,i}) =$$

$$\sum_i g(-\tau_{l,i})c_{i,n} + w_{l,n}$$

The first term is directly dependent on the raised cosine function g(t), the timing delays $\tau_{l,i}$ and the phasors of the unwanted multipaths. This term manifests itself as systematic error, being a random process of bandwidth λ given by the Doppler Spectrum $S(e^{jw})$. This interference cannot be suppressed by the Wiener filter and has to be cancelled or subtracted beforehand, or otherwise, a significant performance degradation of the RAKE receiver may be the result. The second term, however, is always a function of $d_{k \bmod N_c} dv$ for k mod Nc≠V. Under the assumption of long scrambling sequences with good autocorrelation properties, this (stochastic) error will behave approximately like white Gaussian noise $w_{l,n}$ and can be suppressed, at least partially, by the Wiener filter. Therefore, it is now possible to write the ML phasor estimates as follows $$\hat{c}_{ML;l,n} = c_{l,n} + \sum_{\substack{i=0 \\ i \ne l}}^{N_p-1} g(-\tau_{l,i})c_{i,n} + z_{l,n} \quad (15)$$

$$= \sum_{i=0}^{N_p-1} g(-\tau_{l,i})c_{i,n} + z_{l,n}$$

where $z_{l,n} = w_{l,n} + \tilde{m}_{l,n}$ is assumed to be AWGN. Rewriting this in matrix form for all RAKE fingers, we get $$\underbrace{\begin{pmatrix} \hat{c}_{ML;0,n} \\ \vdots \\ \hat{c}_{ML;N_p-1,n} \end{pmatrix}}_{\hat{c}_{ML,n}} = G \underbrace{\begin{pmatrix} c_{0,n} \\ \vdots \\ c_{N_p-1,n} \end{pmatrix}}_{c_n} + n \quad (16)$$

where the matrix G is given by $$G = \begin{pmatrix} g(\tau_{0,0}) & \cdots & g(\tau_{0,N_p-1}) \\ \vdots & \ddots & \vdots \\ g(\tau_{N_p-1,0}) & \cdots & g(\tau_{N_p-1,N_p-1}) \end{pmatrix} \quad (17)$$

The matrix G is Toeplitz, and therefore it becomes easy to calculate the least squares (LS) (for further details see Steven M. Kay, Fundamentals of Statistical Signal Processing-Estimation Theory, Prentice Hall, Englewood Cliffs, N.J., 1993, which is incorporated herewith by reference and which is further referred to as reference [3]) solution of the interference cancellation problem as $$\underbrace{\begin{pmatrix} \hat{c}_{LS;0,n} \\ \vdots \\ \hat{c}_{LS;N_p-1,n} \end{pmatrix}}_{\hat{c}_{LS}} = (G^T G)^{-1} G^T \hat{c}_{ML,n} \quad (18)$$

Since G is Toeplitz, it is usually easily invertible, and in that case we have $(G^T G)^{-1} G^T = G^{-1}$. It is noticed, that knowledge of the multipath delays $\tau_{l,i}$ is required in order to perform the partial interference cancellation. These timing delays can be obtained from the timing-error-detector (TED), which is part of every RAKE finger. The multipath delays $\tau_{l,i}$ are extremely slowly varying processes, and for the purpose of channel estimation can safely be assumed constants. A new class of TED's, which was developed recently, is capable of delivering delay estimates even in the case of physically very closely spaced multipaths. For further details of recent TED technology see G. Fock, P. Schulz-Rittich, J. Baltersee, H. Meyr. "Multipath Resistant Coherent Timing-Error-Detector for DS-CDMA Applications", submitted to ISSSTA2000, Newark, N.J., September 2000, G. Fock, P. Schulz-Rittich, J. Baltersee, H. Meyr. "Optimized Timing-Error-Detector for DS-CDMA Applications in Multipath Scenarios", submitted to Globecom2000, San Francisco, November 2000 and P. Schulz-Rittich, G. Fock, J. Baltersee, H. Meyr. "Low Complexity Adaptive Code Tracking with Improved Multipath Resolution for DS-CDMA Communications ovdf Fading Channels", submitted to ISSSTA2000, Newark, N.J., September 2000, which are incorporated herewith by reference.

Wiener Filtering

The resulting structure for channel estimation is illustrated in FIG. 1. The required known symbols $a_n^*$ are either generated by forming hard decisions after the RAKE combiner, or by inserting known pilot symbols. The ML channel estimates are postprocessed by the interference canceller, before they are filtered with the Wiener filter. The corresponding Wiener filter is denoted in the illustration with F(z). The Wiener phasor estimator is identical in form to the linear minimum mean square error (LMMSE) (see reference [3]) estimator. In reference [1] it is shown, that the estimator and the corresponding MMSE are given by $$\hat{c}_n = \underbrace{c_D^H \cdot (C_D + N_0 \cdot I)^{-1}}_{w^H} \cdot \underbrace{\begin{pmatrix} \hat{c}_{LS,n-N_w+P} \\ \vdots \\ \hat{c}_{LS,n-1+P} \end{pmatrix}}_{\hat{c}_{LS}} \quad (19)$$

$$\sigma_{\tilde{c};w}^2 = w^H(C_D + N_0 \cdot I)w - w^H c_D - c_D^H w + \rho$$

where $$c_D = \rho \cdot \begin{pmatrix} \alpha(0) & \cdots & \alpha(N_w-1) \\ \vdots & \ddots & \vdots \\ \alpha(N_w-1) & \cdots & \alpha(0) \end{pmatrix} \quad (20)$$

$$c_D = \rho \cdot (\alpha(N_w-1-P) \ldots \alpha(1-P))^T \quad (21)$$

are the channel tap autocorrelation matrix and the vector of channel tap autocorrelation samples. Note, that the factors $\alpha(m)=J_0(2\pi\lambda m)$ in equations (20) and (21), and the associated channel autocorrelation function, depend on the normalized Doppler shift $\lambda=\lambda_D*T$. The variable P indicates, whether the estimator works as a predictor or a smoother. For P>0, we have a Wiener smoother, which requires the knowledge of future ML phasor estimates. These future estimates can be obtained only, if a corresponding delay is introduced between the demodulator for the Common Pilot Channel (CPICH) and the Dedicated Physical Control Channel/Dedicated Physical Data Channel (DPCCH/DPDCH) data stream. Ideally, the mobile handset knows its velocity and selects a corresponding set of filter coefficients w. However, this approach is not feasible, because firstly it is difficult to estimate the velocity, and secondly it would require the storage of many different sets of coefficients. With increasing velocity, the channel spectrum and the corresponding (low-pass) Wiener filter becomes wider. Therefore, in order to guarantee that no information loss occurs, all filter coefficients should be designed for the maximum speed envisaged by the corresponding spreading factor. As a consequence, if the true velocity is lower, the channel spectrum is narrower than that of the Wiener filter, and therefore the Wiener filter will not optimally suppress noise.

Performance Analysis and Conclusion

The performance of the new channel estimator was tested by means of simulation. The simulation setup was as follows. We assumed a UMTS FDD system operating with a spreading factor of 4. The Wiener filter was employed as a one-step predictor with $N_w=20$ taps. The velocity was chosen to be v=250 km/h. Obviously, such a speed does not make any sense in an indoor scenario, but it helps to speed up simulation times, since the higher velocity makes the fading process much faster, and it still delivers representative results. The channel consisted of two equally strong paths, with two different channel spacings: A spacing of 0.5 chips, corresponding to an indoor environment, and a spacing of 1.5 chips, corresponding to an outdoor scenario. A transmission length of 10e4 symbols was used.

Figure 2:
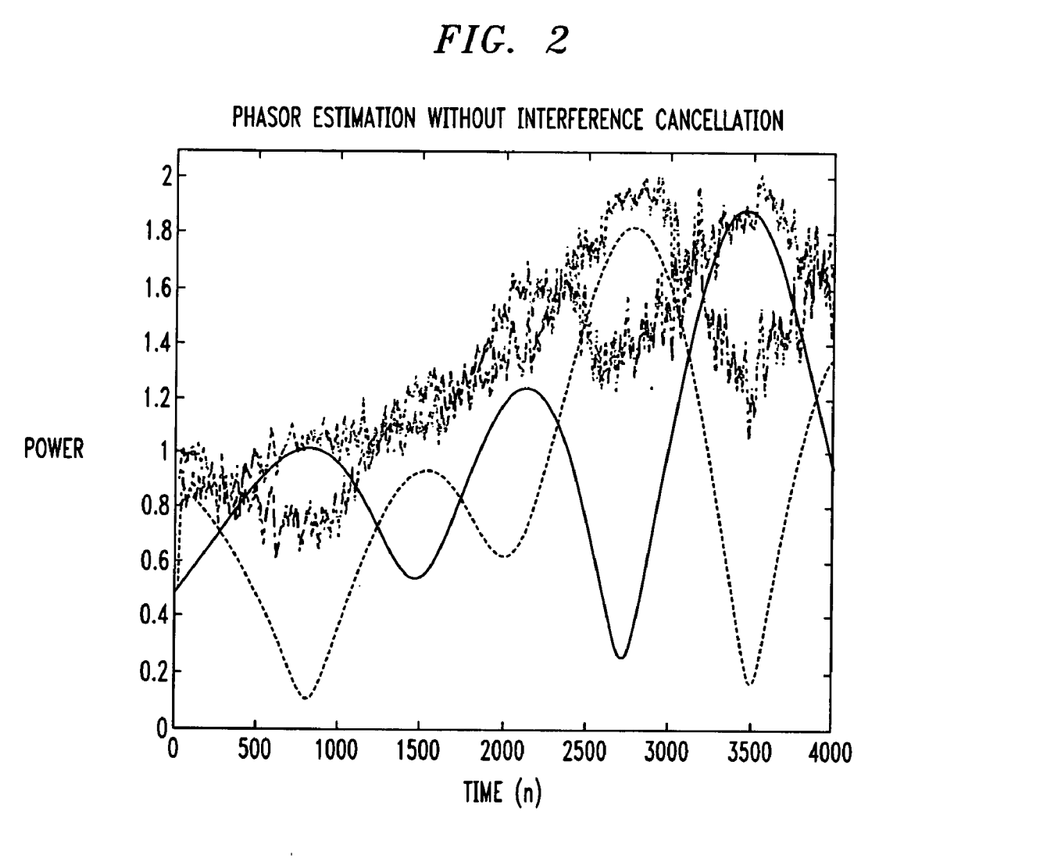
Figure 3:
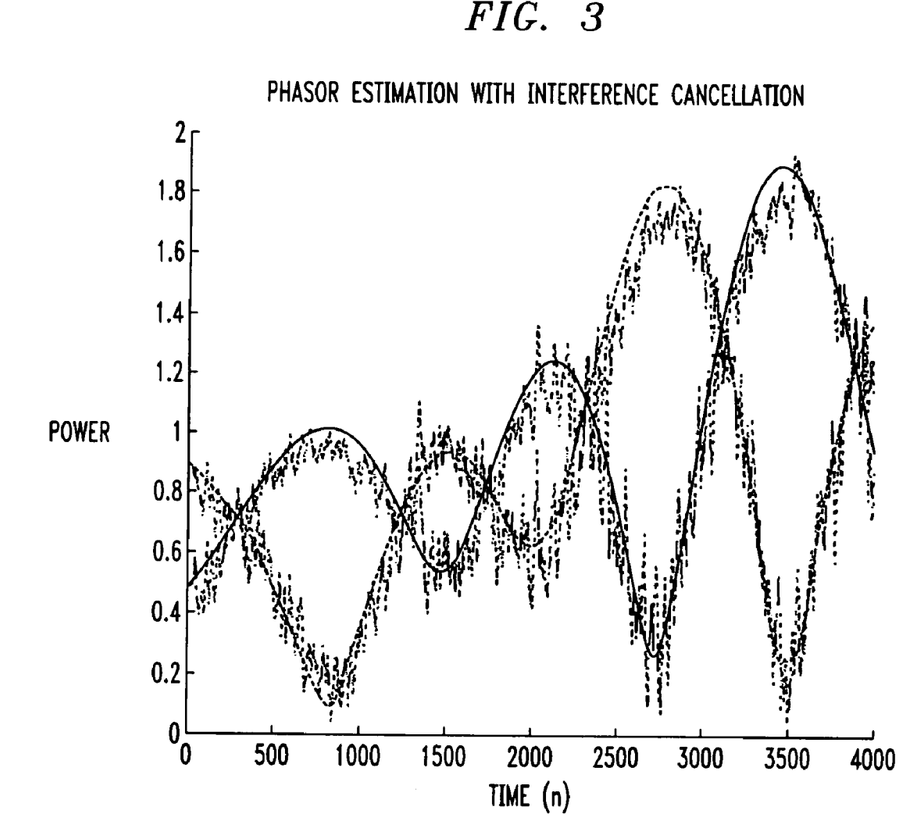
Figure 4:
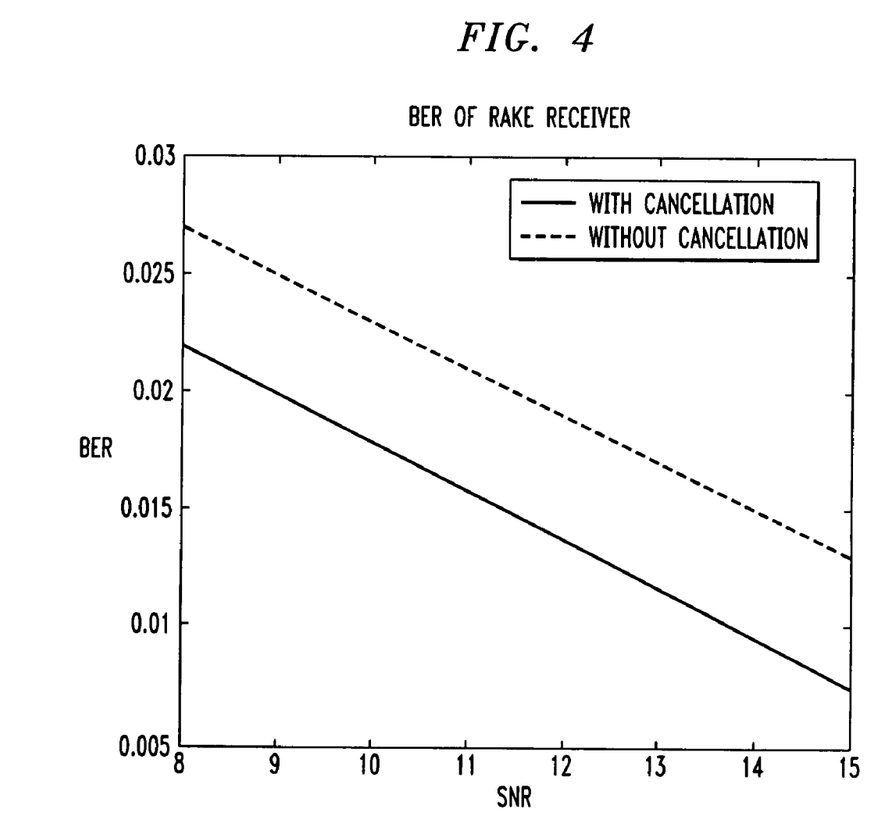

The FIGS. 2 and 3 illustrate qualitatively the improvements which are achievable by the new channel estimation scheme. FIG. 2 shows the power of the channel estimates versus time, when interference cancellation is turned off. This experiment assumed a multipath spacing of 0.5 chips and an SNR of 15 dB. Clearly, in such a scenario, the multipath interference is too strong, and the estimator is not able to follow the true channel. FIG. 3 demonstrates that the new channel estimation scheme employing partial multipath interference cancellation is clearly outperforming the old scheme and tracks the true channel well. In terms of mean square error (MSE) the new algorithm does 15.3 dB better, and when the multipaths are spaced 1.5 chips apart, the MSE advantage is around 5.2 dB. Finally, for the 1.5 spacing, a the bit error ratio (BER) was simulated for SNR's of 8.0 dB and 15.0 dB. The results are shown in FIG. 4 with BER's for the intermediate SNR values interpolated. It is demonstrated that, in this scenario, the RAKE receiver employing the new channel estimation scheme offers considerable performance gains of approximately 3 dB.

It can be concluded that the new algorithm is a simple, yet powerful extension to Wiener channel estimation. Multipath interference is partially cancelled, which leads to substantial performance improvements. Since the calculation of the LS interference cancellation solution only depends on the very slowly varying timing estimates and the raised cosine function, it is sufficient to perform calculation of the estimator's coefficients on a very low rate. Therefore, the additional computational effort required is minimal, which makes the algorithm ideal for RAKE receivers in the mobile user equipment.

Summarising, the invention relates to a channel estimation algorithm is proposed for a RAKE receiver for CDMA communication systems operating in the downlink of a mobile communication scenario yielding an improved phasor estimation. Received signals are distributed to a plurality of receiver fingers of a RAKE receiver. Each receiver finger i is assigned to a signal path of the transmitted signal which is subject to phase shift and power dissipation due to reflection, diffraction and scattering. According to the invention the approach partly cancels multipath/multiuser interference and offers the advantage of being able to cope with physically closely spaced multipaths.

The invention claimed is:

1. A RAKE receiver for processing a received electromagnetic signal being a superposition of signal components of different signal propagation paths, the RAKE receiver comprising:
   an analog-to-digital converter adapted to digitize the received signal;
   a correlator adapted to decorrelate the digitized signal using a code sequence;
   first circuitry adapted to generate received symbols from the decorrelated signal;
   second circuitry adapted to generate, from the received symbols, derotated symbols for a first signal component corresponding to a first signal propagation path;
   third circuitry adapted to generate, using the received symbols and the derotated symbols, an estimated phasor for the first signal component, wherein the derotated symbols are used to generate symbol decisions for the received electromagnetic signal; and
   fourth circuitry adapted to generate a corrected phasor for the first signal component from the estimated phasor by reducing multipath interference from one or more other signal components corresponding to one or more other signal propagation paths, wherein the second circuitry is adapted to generate the derotated symbols using the corrected phasor.

2. The RAKE receiver of claim 1, wherein the multipath interference has a bandwidth substantially equal to the bandwidth of the received signal.

3. The RAKE receiver of claim 1, wherein the estimated phasor is a maximum likelihood estimated phasor.

4. The RAKE receiver of claim 1, wherein the second circuitry is adapted to multiply the received symbols by the corrected phasor to generate the derotated symbols for the first signal component.

5. The RAKE receiver of claim 1, wherein the third circuitry is adapted to generate the estimated phasor for the first signal component based on said symbol decisions derived from the derotated symbols for the first signal component.

6. The RAKE receiver of claim 5, wherein the third circuitry is adapted to generate the estimated phasor for the first signal component by:
   summing the derotated symbols for the first signal component with derotated symbols for each of the one or more other signal components to generate an input to a decider adapted to generate the symbol decisions;
   applying complex conjugation to the symbol decisions to output complex-conjugated symbol decisions; and
   multiplying the complex-conjugated symbol decisions by the received symbols for the first signal component.

7. The RAKE receiver of claim 1, wherein the third circuitry is adapted to generate the estimated phasor for the first signal component based on pilot symbols.

8. The RAKE receiver of claim 1, wherein the third circuitry comprises a switch adapted to select either (i) symbol decisions derived from the derotated symbols for the first signal component or (ii) pilot symbols for use in generating the estimated phasor.

9. The RAKE receiver of claim 1, wherein the fourth circuitry is adapted to generate the corrected phasor for the first signal component using the estimated phasor for the first signal component and one or more other estimated phasors for the one or more other signal components.

10. The RAKE receiver of claim 9, wherein the fourth circuitry is adapted to generate the corrected phasor for the first signal component using timing error signals for the first and the one or more other signal components.

11. The RAKE receiver of claim 1, wherein the fourth circuitry is adapted to:
  estimate the multipath interference for the first signal component; and
  subtract the estimated multipath interference from the estimated phasor to generate the corrected phasor.

12. The RAKE receiver of claim 1, wherein the fourth circuitry is further adapted to filter the corrected phasor to remove multipath interference.

13. The RAKE receiver of claim 1, wherein the fourth circuitry comprises a Wiener filter adapted to filter the corrected phasor to remove multipath interference corresponding to white noise.

14. The RAKE receiver of claim 1, wherein:
  the multipath interference has a bandwidth substantially equal to the bandwidth of the received signal;
  the estimated phasor is a maximum likelihood estimated phasor;
  the second circuitry is adapted to multiply the received symbols by the corrected phasor to generate the derotated symbols for the first signal component;
  the third circuitry comprises a switch adapted to select either (i) symbol decisions derived from the derotated symbols for the first signal component and the one or more other signal components or (ii) pilot symbols for use in generating the estimated phasor;
  if the switch selects the symbol decisions for use in generating the estimated phasor, then the third circuitry generates the estimated phasor for the first signal component by:
    summing the derotated symbols for the first signal component with derotated symbols for each of the one or more other signal components to generate an input to a decider adapted to generate the symbol decisions;
    applying complex conjugation to the symbol decisions; and
    multiplying the complex-conjugated symbol decisions by the received symbols for the first signal component;
  the fourth circuitry is adapted to:
    estimate the multipath interference for the first signal component using (i) the estimated phasor for the first signal component and one or more other estimated phasors for the one or more other signal components and (ii) timing error signals for the first and the one or more other signal components; and
    subtract the estimated multipath interference from the estimated phasor to generate the corrected phasor; and
  the fourth circuitry comprises a Wiener filter adapted to filter the corrected phasor to remove multipath interference corresponding to white noise.

* * * * *